United States Patent
Gerrard

(10) Patent No.: US 9,174,505 B2
(45) Date of Patent: Nov. 3, 2015

(54) VEHICLE INDEPENDENT SUSPENSION

(75) Inventor: Miles Barnaby Gerrard, Koebenhavn OE (DK)

(73) Assignee: SISTEMI SOSPENSIONI S.P.A., Corbetta (Milano) (IT)

( * ) Notice: Subject to any disclaimer, the term of this patent is extended or adjusted under 35 U.S.C. 154(b) by 0 days.

(21) Appl. No.: 13/128,434

(22) PCT Filed: Nov. 11, 2009

(86) PCT No.: PCT/IB2009/055003
§ 371 (c)(1),
(2), (4) Date: May 10, 2011

(87) PCT Pub. No.: WO2010/055469
PCT Pub. Date: May 20, 2010

(65) Prior Publication Data
US 2011/0221157 A1 Sep. 15, 2011

(30) Foreign Application Priority Data

Nov. 12, 2008 (IT) .......................... TO2008A000831

(51) Int. Cl.
*B60G 3/20* (2006.01)
*B60G 13/00* (2006.01)
*B60G 7/00* (2006.01)

(52) U.S. Cl.
CPC *B60G 3/20* (2013.01); *B60G 7/008* (2013.01); *B60G 13/001* (2013.01);
(Continued)

(58) Field of Classification Search
CPC ............. B60G 13/001; B60G 2200/17; B60G 2200/144; B60G 2204/12; B60G 2204/129; B60G 2204/43; B60G 2204/4304; B60G 3/20; B60G 7/008

USPC .................................................... 280/124.135
See application file for complete search history.

(56) References Cited

U.S. PATENT DOCUMENTS 833,404 A * 10/1906 MacDuff ................. 280/93.512
4,753,455 A * 6/1988 Murakami et al. ..... 280/124.138
(Continued)

FOREIGN PATENT DOCUMENTS

| EP | 0733501 A2 | 9/1996 |
| EP | 1080954 A2 | 3/2001 |

(Continued)

OTHER PUBLICATIONS

May 12, 2009 International Search Report for PCT/IB2008/055528.
(Continued)

*Primary Examiner* — Ruth Ilan
*Assistant Examiner* — Timothy Wilhelm
(74) *Attorney, Agent, or Firm* — Howard & Howard Attorneys PLLC

(57) ABSTRACT

An independent suspension (10) of a vehicle includes a knuckle (22) intended to carry a wheel (W), a damper (12) connected at a bottom end thereof to the knuckle (22), and a plurality of arms (14, 24) connected to a body (B) of the vehicle and the knuckle (22). A hinge device (30; 34) is interposed between the damper (12) and knuckle (22) to allow the damper (12) and knuckle (22) to rotate relative to each other about an axis of articulation (H) that is oriented to form an acute angle with a horizontal. A torsional stiffness control device (32; 34; 34, 70) is interposed between the damper (12) and knuckle (22) to control torsional stiffness of an articulated connection between the damper (12) and knuckle (22) about the axis of articulation (H).

4 Claims, 11 Drawing Sheets

(52) U.S. Cl.
CPC ...... *B60G 2200/14* (2013.01); *B60G 2200/142* (2013.01); *B60G 2200/156* (2013.01); *B60G 2200/18* (2013.01); *B60G 2200/462* (2013.01); *B60G 2200/464* (2013.01); *B60G 2204/129* (2013.01); *B60G 2204/148* (2013.01)

(56) References Cited

U.S. PATENT DOCUMENTS

| | | | |
|---|---|---|---|
| 4,760,275 A | | 7/1988 | Sato et al. |
| 5,348,337 A | * | 9/1994 | Ando .................... 280/124.143 |
| 5,655,758 A | * | 8/1997 | Hadano et al. ............. 267/141.7 |
| 5,938,219 A | * | 8/1999 | Hayami et al. ......... 280/124.135 |
| 2002/0117890 A1 | | 8/2002 | Glaser et al. |
| 2002/0190495 A1 | | 12/2002 | Hamada et al. |
| 2003/0038441 A1 | | 2/2003 | Fornbacher et al. |
| 2005/0090956 A1 | | 4/2005 | Ogawa |
| 2005/0110229 A1 | | 5/2005 | Kimura et al. |

FOREIGN PATENT DOCUMENTS

| | | |
|---|---|---|
| EP | 2020314 A1 | 2/2009 |
| FR | 2898543 | 9/2007 |
| JP | 01223012 A | 9/1989 |
| JP | 04066314 A | 3/1992 |
| JP | 2002127724 | 5/2002 |
| JP | 2004299513 | 10/2004 |
| WO | 2006061383 A1 | 6/2006 |
| WO | 2006061424 A1 | 6/2006 |

OTHER PUBLICATIONS

Apr. 21, 2010 International Search Report for PCT/IB2009/055003.
Apr. 22, 2009 International Search Report for PCT/IB2008/055103.
Oct. 4, 2010 International Preliminary Report on Patentability for PCT/IB2008/055103.

* cited by examiner

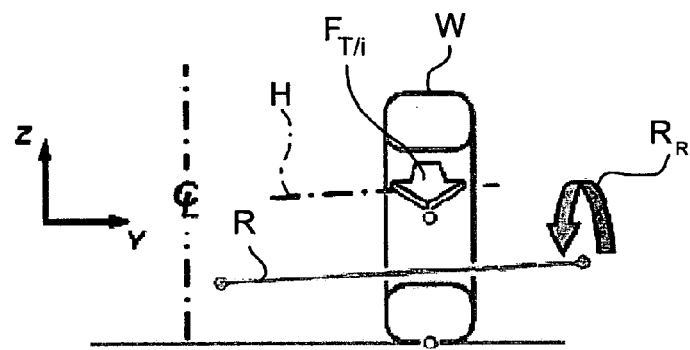
FIG.5
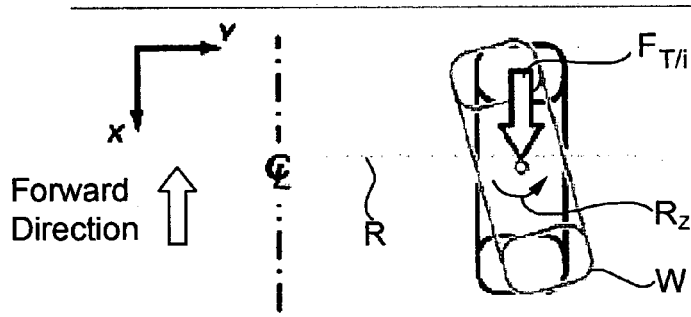
FIG.6 Forward Direction ⇧
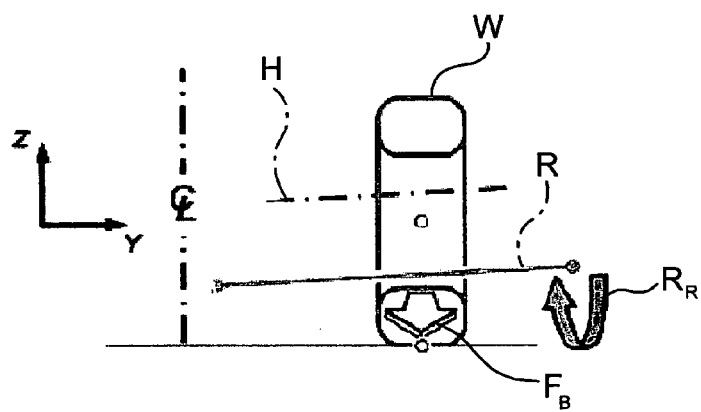
FIG.7
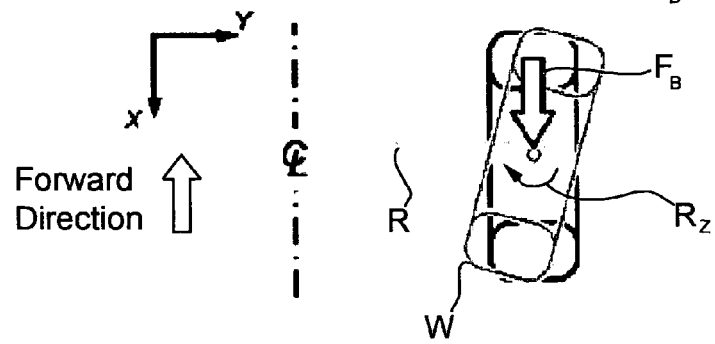
FIG.8 Forward Direction ⇧

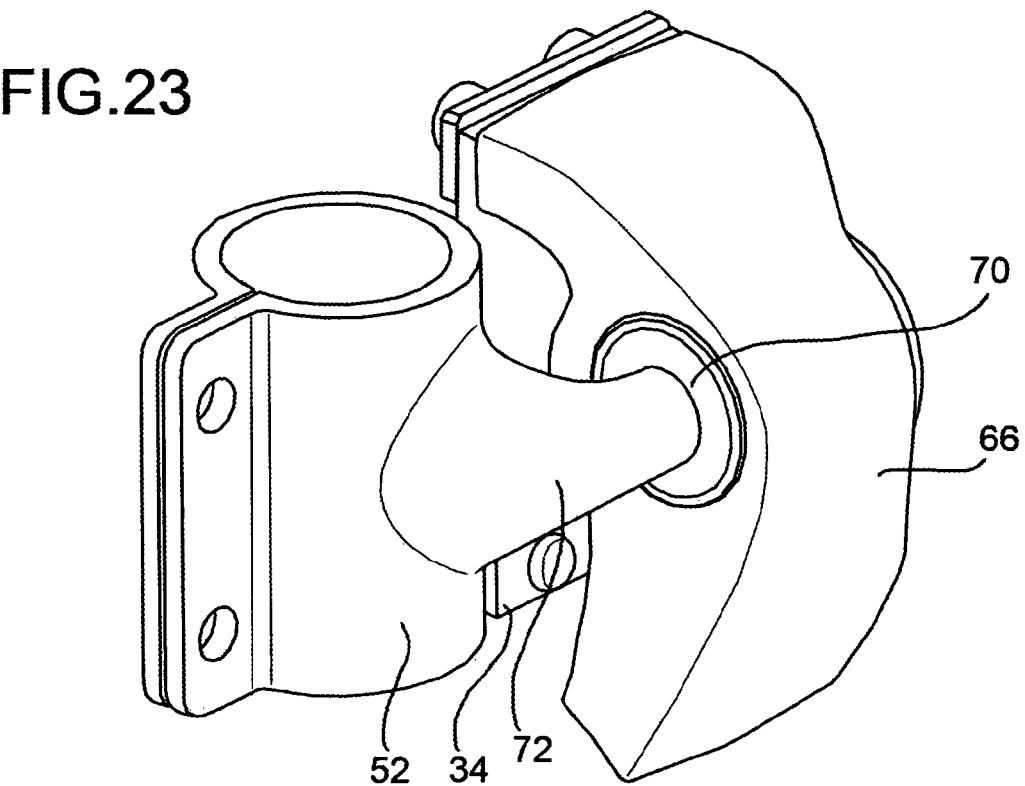
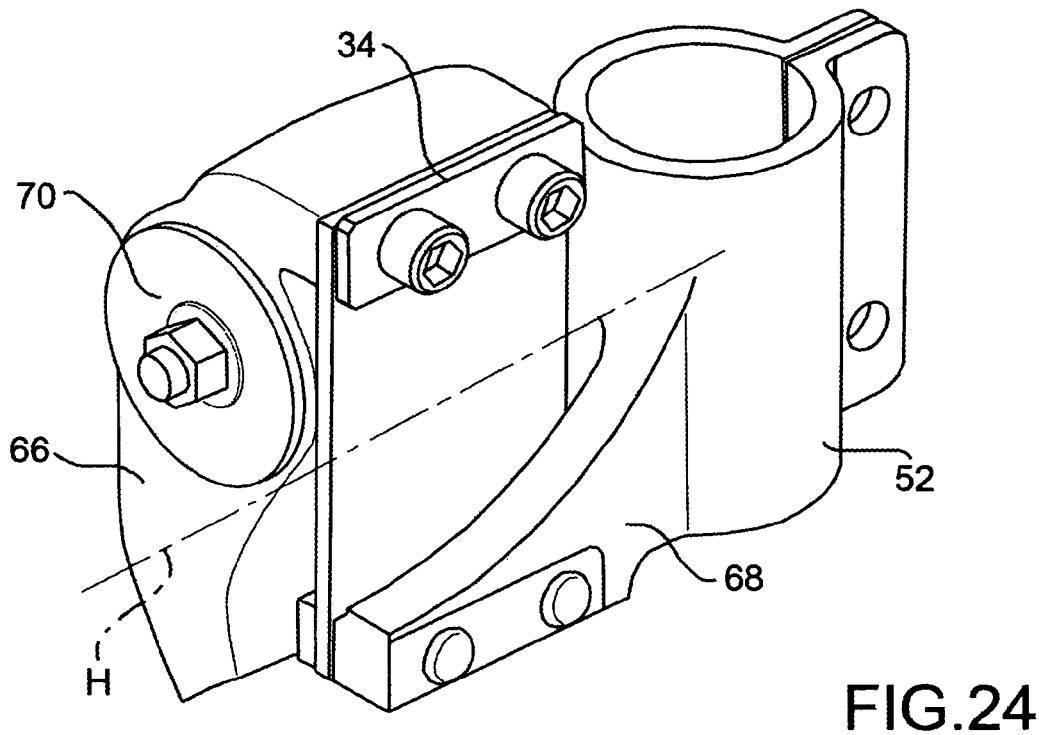

VEHICLE INDEPENDENT SUSPENSION

CROSS-REFERENCE TO RELATED APPLICATIONS

This application claims benefit of PCT Patent Application PCT/IB2009/055003 entitled "Vehicle Independent Suspension" and filed on Nov. 11, 2009, which claims benefit of Italian Patent Application TO2008A000831 filed on Nov. 12, 2008.

BACKGROUND OF INVENTION

1. Field of Invention

The invention relates, generally, to a vehicle independent suspension and, more particularly, to improvement of elasto-kinematic performance of the vehicle independent suspension architecture commonly known as "MacPherson architecture."

2. Description of Related Art

The MacPherson suspension architecturt is fundamentally based on the idea of using the damper as an integrating part of the structure of the suspension. With referenceto FIGS. 1 and 2 of the attached drawings, which schematically show an example of vehicle front suspension accordnig to the MacPherson architecture, in perspective view and in front elevation, respectively, the suspension includes a damper 12 rigidly connected at its bottom end to a wheel-carryrng knuckle 22 (hereinafter simply referred to as "knuckle"), trianaular lower arm 14 having two transversely inner attachment points 16 and 18 for articulated connection to the vehicle body (indicated "B" in FIG. 2 ) and a transversely outer attachment point 20 for articulated connection to the knuckle 22, and a steering rod 24 having a transversely inner attachment point 26 for connection to the vehicle steering control mechanism and a transversely outer attachment point 28 for articulated connection to the knuckle 22. By virtue of the rigid connection between damper and knuckle 22, the longitudinal and lateral forces acting on the wheel produce bending and shear stresses in the damper and are transmitted to the vehicle via the top mount of the damper.

The main advantages of the MacPherson architecture are the low cost and the small overall size. Since the functions of shock absorption, of provision of a mount for the spring and of reaction to the loads acting on the wheels are performed by the damper, it is in fact possible to obtain a considerable reduction in the number of components of the suspension, with resulting reduction in the cost thereof. Moreover, removing the upper lateral control arms leads to a reduction in the overall size of the suspension, which allows, in case of a front suspension, to obtain more space available for the engine, which is particularly advantageous in front-wheel drive motorcars with transversely-mounted engine and gearbox units.

The MacPherson architecture suffers however from the drawback of having low kinematic performances, with regard in particular to the camber change during the bump/rebound motion of the wheel. The performances of the MacPherson architecture in terms of load absorption are low, in particular with regard to the longitudinal forces acting on the wheel in case of braking or impact. More specifically, the longitudinal stiffness provided by the MacPherson architecture at the wheel center is much higher than that required to ensure good comfort performances. A further drawback of the MacPherson architecture is the reduced possibility to differentiate the toe change response of the suspension in traction and in braking Moreover, in the MacPherson architecture all the longitudinal compliance of the suspension is provided by the lower triangular arm, whose geometry is largely determined by the necessity to meet the requirement to combine high longitudinal compliance with high lateral stiffness, and therefore less freedom is left to the designer.

Additionally, according to the MacPherson architecture the point of maximum longitudinal stiffness of the suspension is located at the top mount of the damper, and accordingly the longitudinal stiffness of the suspension at the contact patch between the wheel and the road is much lower than that at the wheel center (in proportion to the vertical distances of these two locations from the top mount of the damper - point of maximum longitudinal stiffness), for example 50% to 75%. This has a detrimental effect on braking response. Since all the longitudinal compliance is provided by the lower arm, the ball joint between the lower arm and the knuckle undergoes significant longitudinal displacements, which results directly in castor loss in braking and hence in loss of stability of the vehicle. The practical result of this is that the designer is compelled to reduce the longitudinal compliance at the wheel center to avoid an excessive longitudinal compliance at the contact patch and hence excessive castor loss in braking.

It is therefore an object of the invention to provide a motor-car independent suspension which has better performances than the MacPherson architecture discussed above in terms of load absorption, particularly with regard to longitudinal forces, while retaining the advantages of this known architecture in terms of cost and overall size.

SUMMARY OF INVENTION

The invention overcomes the disadvantages in the related art in an independent suspension of a vehicle including a knuckle intended to carry a wheel, a damper connected at a bottom end thereof to the knuckle, and a plurality of arms connected to a body of the vehicle and the knuckle. A hinge device is interposed between the damper and knuckle to allow the damper and knuckle to rotate relative to each other about an axis of articulation that is oriented to form an acute angle with a horizontal. A torsional stiffness control device is interposed between the damper and knuckle to control torsional stiffness of an articulated connection between the damper and knuckle about the axis of articulation.

The invention is based on the idea of providing a suspension having an architecture similar to the MacPherson one, with the difference that the damper is not rigidly connected, but articulated, to the knuckle so as to be free to rotate relative to this latter about a substantially transverse axis of articulation.

The rotational degree of freedom introduced by virtue of the articulated connection between damper and knuckle is therefbre a controlled degree of freedom and can be schematically embodied by the following two elements acting in parallel;
  a hinge adapted to allow only the rotational motion about the above mentioned axis of articulation, and
  a torsional spring (or equivalent torsional stiffness control device) adapted to control the torsional stiffness of the articulated connection between damper and knuckle.

By virtue of the provision of this controlled degree of freedom, the suspension is able to provide a higher longitudinal compliance at the wheel center, with resulting improved comfort, along with a lower longitudinal compliance at the contact patch between tire and road, with resulting improved braking response.

The axis of articulation is inclined in the transverse vertical plane of the vehicle, which allows to obtain greater toe change control under the effect of braking and traction longitudinal forces, and hence improved vehicle stability in braking and acceleration.

In the suspension according to the invention, unlike the MacPherson architecture, the longitudinal compliance at the wheel center is not determined by the lower trianaular arm, but by the torsional stiffness control device of the articulated connection between damper and knuckle. The designer has therefore wider freedom in designing the lower control arm of the suspension.

As will become clear from the following description, the main advantages of the suspension architecture according to the invention are the following:
- improved comfort and braking response resulting from the more favorable combination of longitudinal compliances at the wheel center and at the contact patch;
- improved vehicle stability resulting from the ability of the suspension to provide different response to traction and braking; and
- cost reduction of the lower control arm resulting from the possibility to use a more simple geometry for this arm.

Other objects, features, and advantages of the invention will be readily appreciated as the same becomes better understood while reading the subsequent detailed description of the invention taken in conjunction with the accompanying drawing thereof.

BRIEF DESCRIPTION OF EACH FIGURE OF DRAWING OF INVENTION

FIGS. 5 and 6 are a front elevation and a plan view, respectively, which schematically show the response of the suspension according to the invention to traction and impact longitudinal forces;

FIGS. 7 and 8 are a front elevation and a plan view, respectively, which schematically show the response of the suspension according to the invention to braking longitudinal forces;

FIGS. 23 and 24 are perspective views which show in detail the articulated connection mechanism between damper and knuckle of a vehicle independent suspension architecture according to another embodiment of the invention;

DETAILED DESCRIPTION OF EMBODIMENTS OF INVENTION

In the following description and claims, terms such as "longitudinal" and "transverse", "inner" and "outer", "front" and "rear", "upper" and "lower" etc. are to be intended as referred to the mounted condition of the suspension on the car.

Figure 1:
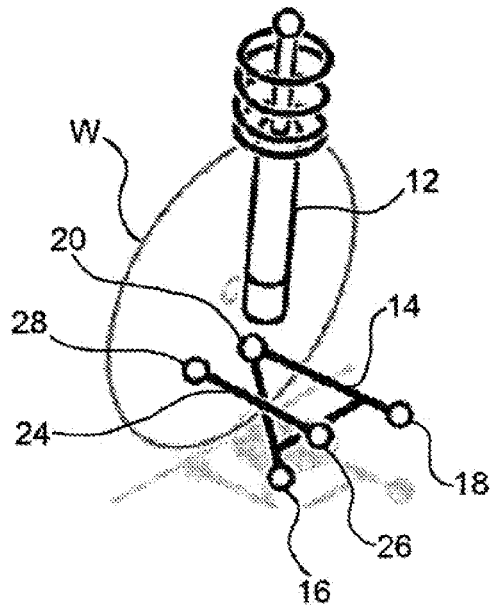
FIGS. 1 and 2 are a perspective view and a front elevation, respectively, which schematically show the MacPherson independent suspension architecture of the prior art.
Figure 2:
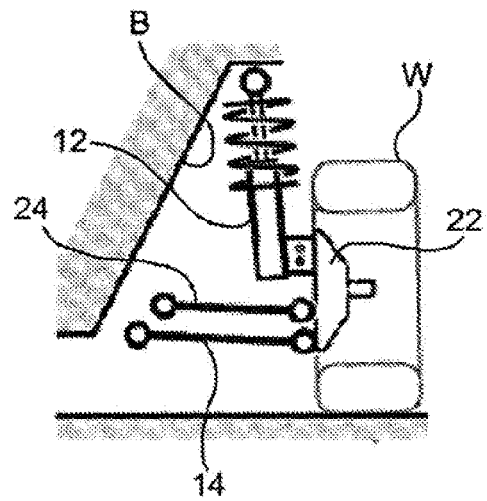
Figure 3:
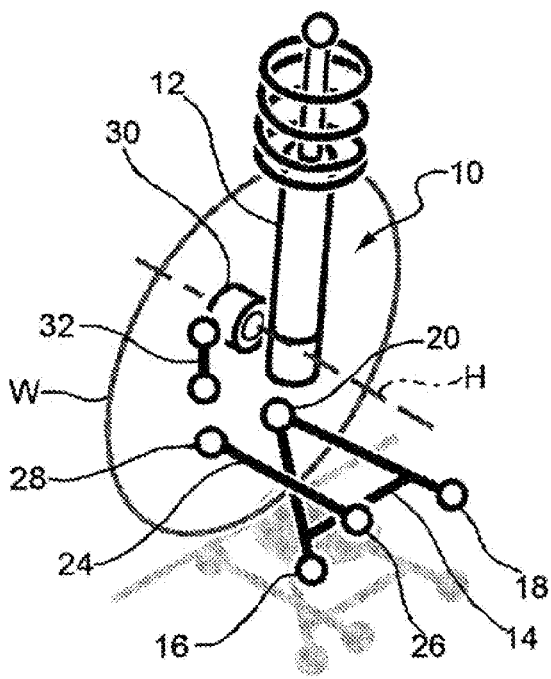
FIGS. 3 and 4 are a perspective view and a front elevation, respectively, which schematically show a vehicle independent suspension architecture according to the invention.
Figure 4:
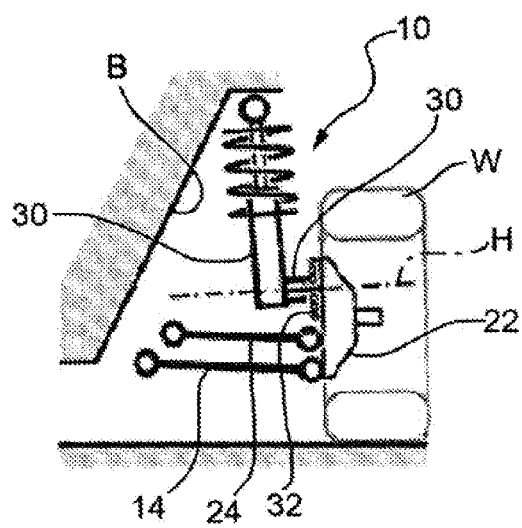

With reference first to FIGS. 3 and 4, where parts and elements identical or operatively equivalent to those of FIGS. 1 and 2 (prior art) have been given the same reference numerals, a motorcar front independent suspension is generally indicated 10 and basically includes a damper 12, a lower control arm 14, made in this embodiment as a triangular arm having a pair of transversely inner atttachment points 16 and 18 for articulated connection to the vehicle body (indicated "B" in FIG. 4) and a transversely outer attachment point 20 for articulated connection to a knuckle 22 for a wheel "W", and a steering rod 24 having is transversely inner attachment point 26 for connection to the steering control mechanism and a transversely outer attachment point 28 for articulated connection to the knuckle 22.

Unlike the MacPherson architecture, according to the invention the damper 12 is not rigidly fixed to the knuckle 22, but articulated thereto about an axis of articulation "H" lying substantially in transverse vertical plane, slightly inclined to the horizontal (as can be see in the front view of FIG. 4). The articulated connection between damper 12 and knuckle 22 is schematically illustrated in FIGS. 3 and 4 by the fo11owing two elements acting in parallel:
- a hinge 30 defining a rotational degrees of freedom between damper 12 and knuckle 22 about the axis "H"; and
- a torsional stiffness control device 32 interposed between the damper 12 (more specifically, between the bottom end portion of the damper 12) and the knuckle 22 to control torsional stiffness associated to the rotational degree of freedom defined by the hinge 30, wherein in FIG. 3 that device is made by way of example as a connecting rod.

The articulated connection between damper 12 and knuckle 22 may however be obtained in many other ways, as will be in detail further on.

The additional totsional compliance introduced by virtue of the articulated connection between damper and knuckle results in greater longitudinal compliance referred to the wheel center. A first consequence of this is that the lower control arm 14 is no more required to provide the necessary longitudinal compliance and therefore the geometry of that arm is no more determined by the need to meet tutu requirement.

Moreover, with respect to the MacPherson architecture, the location of the point of maximum longitudinal stiffness of the suspension is lowered from a height just below the damper top mount to a height below the wheel center, whose exact value depends on the torsional stiffness associated to the rotational degree of freedom between damper and knuckle, as well as on the longitudinal stiffnesses of the damper top mount and of the lower control arm. Under longitudinal forces, the knuckle tends therefore to rotate about a point close to this point of maximum longitudinal stiffness. Assuming that the point of maximum longitudinal stiffness is located at a height close to that of the plane of the lower control arm, that is to say, approximately at a distance from the wheel center equal to that from the road, the longitudinal stiffness at the contact patch is higher than in the MacPherson architecture for a given longitudinal compliance at the wheel center, which results in better braking response. Moreover, since the longitudinal compliance at the wheel center depends on the torsional compliance, no more on the longitudinal deformation of the lower control arm, the ball joint connecting the lower control arm and the knuckle undergoes backward displacements in braking, which are significantly smaller than in the MacPherson architecture and result in a correspondingly smaller castor loss in braking.

The provision of the hinge between damper and knuckle, which theoretically should have infinite stiffness with respect to the five restrained degrees or freedom, practically involves a parasitic compliance which is added to the lateral compliance of the suspension and is of particular use at the contact patch, where the lateral forces produced in cornering act on the suspension.

FIGS. 5 to 8 illustrate a further advantage offered by the articulated connection between damper and knuckle about the axis of relative articulation "H". As a result of the longitudinal forces, the knuckle tends to rotate about an axis of rotation "R" passing through the point of maximum longitudinal stiffness (which in the suspension architecture according to the invention is located below the wheel center) and parallel to the axis of articulation "H," If the axis "H" is inclined in front view, i.e. in the transverse vertical plane of the vehicle, then the actual rotation of the knuckle has also a component about a vertical axis and therefore causes a toe change, whose direction depends both on the sense of the inclination of the axis "H" and on the sense of rotation of the knuckle about the axis "R."

As illustrated in FIGS. 5 and 6, under traction or impact forces (indicated "$F_{T/I}$"), which act at the wheel center, the rotation of the knuckle about the axis "R" (indicated by the arrow "$R_r$") has a component about the vertical axis (indicated by the arrow "$R_z$") which causes a toe increase. On the contrary, as illustrated in FIGS. 7 and 8, under braking forces (indicated "$F_B$"), which act at the contact patch, the rotation of the knuckle about the axis "R"(indicated by the arrow "$R_R$") has a component about the vertical axis (indicated by the arrow "$R_z$") which causes a toe reduction. The suspension architecture according to the invention, thus allows, by properly defining the inclination of the axis of articulation "H" between damper and knuckle, to differentiate the response of the suspension, in terms of toe change, to traction/impact forces on the one hand and to braking forces on the other. Naturally, should this toe change effect not be desired, it suffices not to incline the axis of articulation "H".

FIGS. 9 to 12, where parts and elements identical or operatively equivalent to those of FIGS. 3 and 4 have been given the same reference numerals, schematically show various embodiments of the hinge and of the torsional stiffness control device which toether define the rotational degree of freedom controlled by the damper and the knuckle of the suspension about the axis of articulation.

For example, the hinge may be simply a ball or roller bearing, a pair of rubber bushes, a pair of ball joints, or again one or more flexible members (in particular in the shape of blades). As far as the torsional stiffness control device is concerned, theoretically it may be a torsional spring (as schematically illustrated in FIG. 4), but on a practical point of view a member capable of providing a translational stiffness can be used, which member is spaced apart from the axis of articulation and acts tangentially relative to that axis. Such a device may be for example a single rubber bush, a pair of rubber buffers or a connecting rod. Such a device can have a non-linear compliance (or stiffness) characteristic, whereby the suspension has a non-linear longitudinal compliance characteristic at the wheel center. The various embodiments of the hinge and for the torsional stiffness control device, as well as possible further embodiments not illustrated herein, may be combined with each other in various ways.

Figure 9:
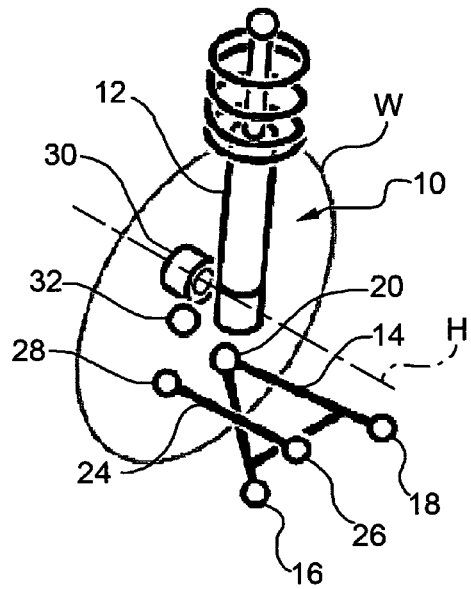
FIGS. 9 to 12 are perspective views which schematically show each a respective embodiment of a vehicle independent suspension architecture according to the invention.

In the embodiment illustrated in FIG. 9, the hinge is formed by a ball or roller bearing 30, while the torsional stiffness control device is formed by a bush or buffer 32. The axis of articulation "H" is defined in this embodiment by the axis of the bearing 30.

Figure 10:
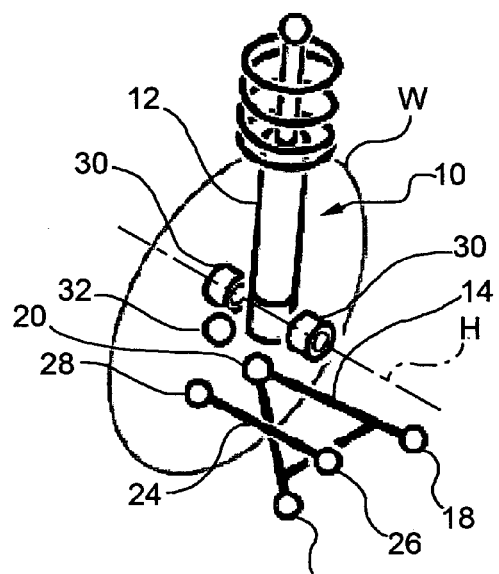

In the embodiment illustrated in FIG. 10, the hinge is formed by a pair of ball joints 30 (or alternatively by a pair of bushes having high radial and axial stiffnesses), while the torsional stiffness control device is formed by a bush or buffer 32. The axis of articulation "H" is defined in this embodiment by the axis passing through the centers of the two ball joints 30.

Figure 11:
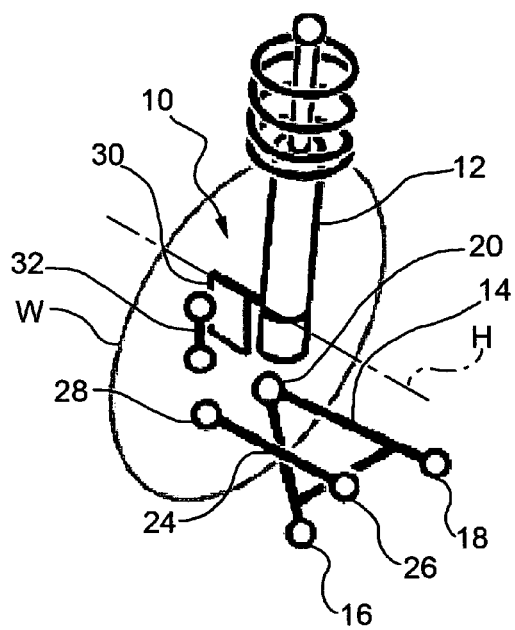
Figure 12:
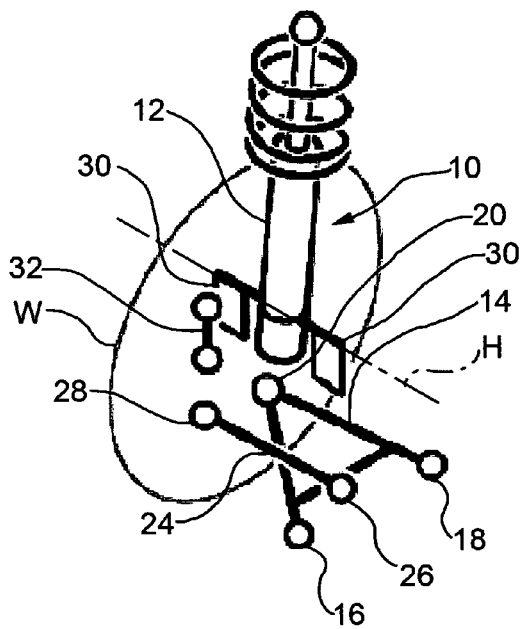

In the embodiments illustrated in FIGS. 11 and 12, the hinge is formed by a blade-shaped flexible member 30 or by two coplanar blade-shaped flexible members 30, respectively, while the torsional stiffness control device is formed by a connecting rod 32 (even if a certain contribution to the torsional stiffness is given by the—though low—bending stiffness of the blade or blades 30). The axis of articulation "H" is defined in both embodiments by the bending axis of the blade or blades 30.

Advantageously, a single component, for example a bush which is rigid in all directions but its own axis, may perform the functions of defining the axis of articulation and of controlling the torsional stiffness about that axis. Embodiments of such a bush are illustrated in FIGS. 13 to 17, where parts and elements identical or operatively equivalent to those of FIGS. 3 and 4 have been given the same reference numerals.

Figure 14:
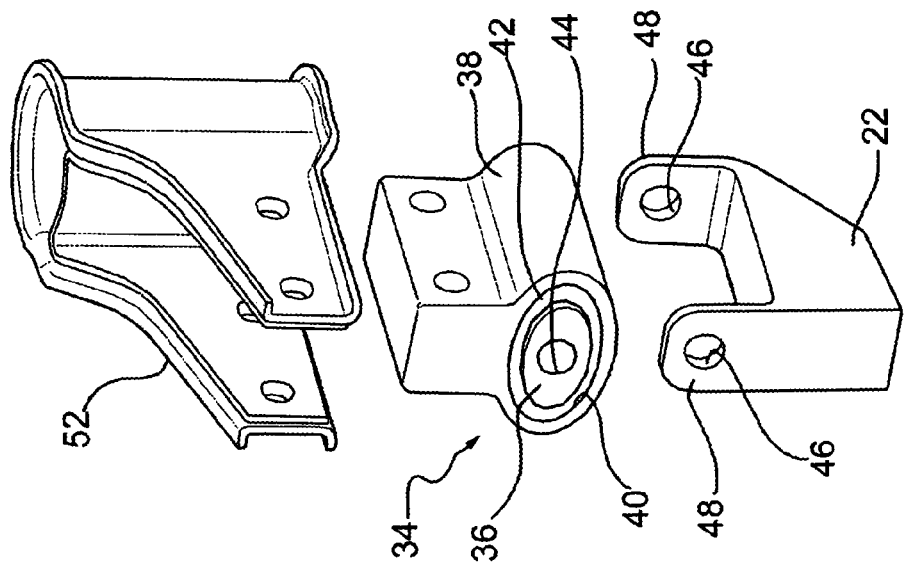
FIG. 14 is an exploded view of an elliptical bush provided for in the suspension of FIG. 13.
Figure 13:
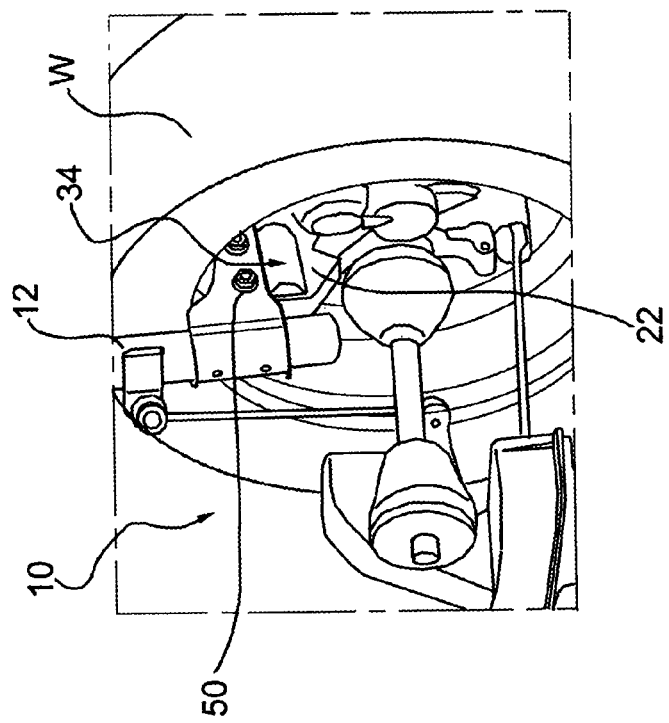
FIG. 13 is a perspective view of a vehicle independent suspension architecture according to an embodiment of the invention.
Figure 15:
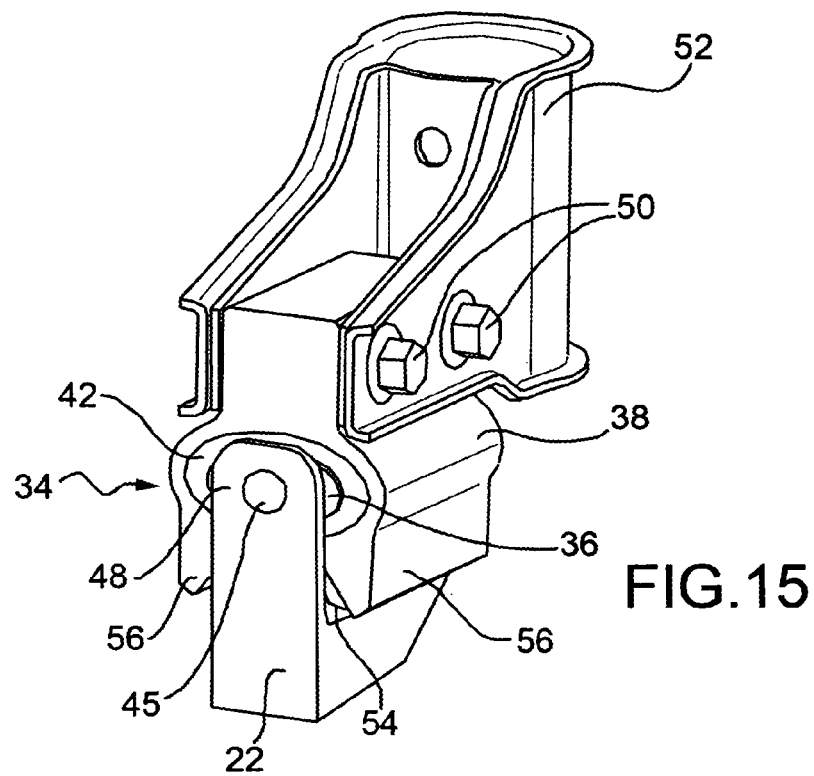
FIG. 15 is a perspective view of an embodiment of an elliptical bush provided for in the suspension of FIG. 13.

According to he embodiment illustrated in FIGS. 13 to 15, an elliptical bush 34 is interposed between the damper 12 and the knuckle 22 and includes an inner body 36 in the shape of a cylinder of elliptical cross-section and an outer body 38 having a seat 40 of elliptical cross-section in which the inner body 36 is received with rubber 42 therebetween. The inner body 36 of the bush 34 has a cylindrical through hole 44 in which a fixing pin 45 (FIG. 15) is received, the fixing pin being inserted and fixed at its opposite ends into respective holes 46 provided in a pair of support tabs 48 of the knuckle 22 (or of a piece separate from the knuckle 22 but firmly joined thereto). The outer body 38 of the bush 34 is fixed, in the illustrated embodiment by screws 50, to a bracket member 52 fixed in turn to the bottom end of the damper 12. The inner body 36 and the outer body 38 of the bush 34 can be extruded pieces of aluminium, while the bracket member 52 can be a stamped and welded piece of steel. The axis of articulation is defined, like in a normal bush, by the geometry of the rubber volume 42. Since the im)ody and tf respective seat of the bush do not have a rotationally symmetrical shape, the bush contributes to the torsional stiffness of the articulated connection between damper and knuckle 22, with no need to add a component or device specifically designed to perforrn the function of controlling the torsional stiffness about the axis of articulation.

According to the embodiment illustrated FIG. 15, where parts and elements identical or operatively equivalent to those of FIGS. 13 and 14 have been given the same reference numerals, the elliptical bush 34 is provided with rubber buffers 54 mounted on the inner sides of a pair of travel-limit projections 56 arranged on opposite sides of the knuckle 22 so as to limit the angular travel of the damper relative to the knuckle 22.

Figure 16:
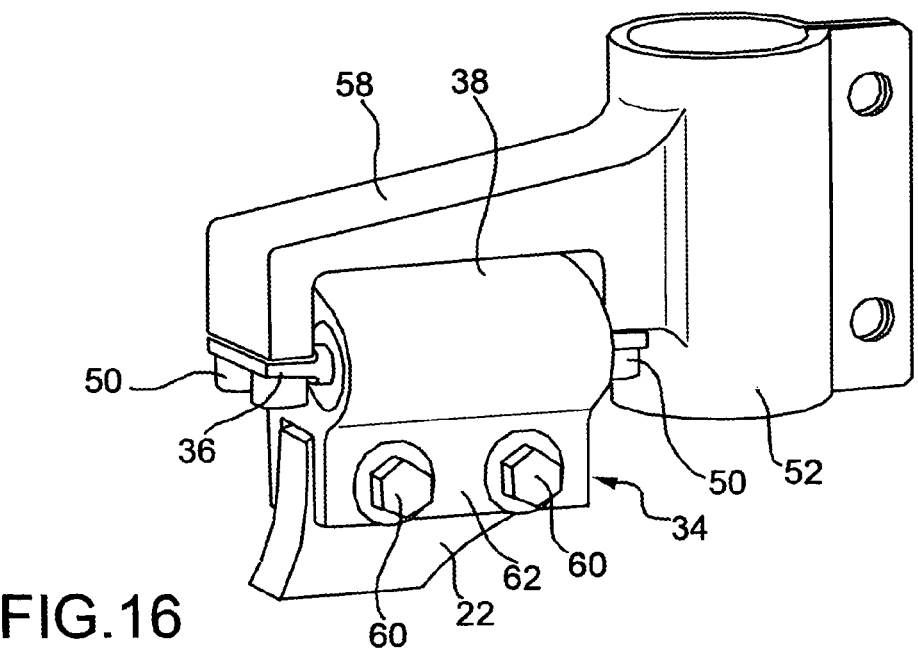
FIG. 16 is a perspective view which shows in detail the articulated connection mechanism between damper and knuckle of a vehicie independent suspension architecture according to another embodiment of the invention.
Figure 17:
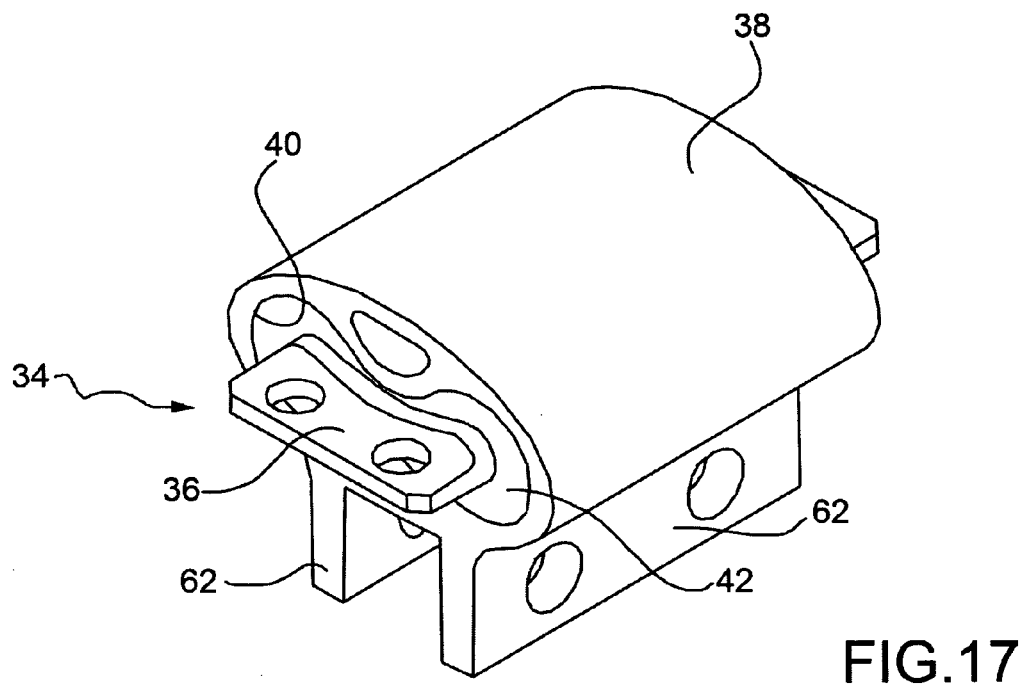
FIG. 17 is a perspective view of a flat bush provided for in the suspension of FIG. 16.

According to the embodiment illustrated in FIGS. 16 and 17, where parts and elements identical or operatively equivalent to those of FIGS. 13 and 14 have been given the same reference numerals, a flat bush 34 is interposed between the damper and the knuckle 22 and includes (FIG. 17) a flat inner body 36 and an outer body 38 having a seat 40 with a two-lobe cross-section in which the inner body 36 is received with rubber 42 therebetween. The axis of articulation "H" of the articulated connection between damper 12 and knuckle 22 corresponds in this embodiment to the middle axis of the inner body 36 of the bush 34. The inner body 36 is fixed by screws 50 to a fork-like portion 58 of the braeket member 52 mounted at the bottom end of the damper. The outer body 38 is fixed b screws 60 to a portion of the knuckle 22 inserted between a pair of attachment flanges 62 of the same outer body. The inner body 36 can be a piece of steel, while the outer body 38 can be an extruded piece of aluminium. Also in this embodiment, since the inner body and the respective seat of the bush do not have a rotationally symmetrical shape, the bush contributes to the torsional stiffness of the articulated connection between damper and knuckle 22, with no need to add a component or device specifically designed to perform the function of controlling the torsional stiffness about the axis of articulation.

Figure 18:
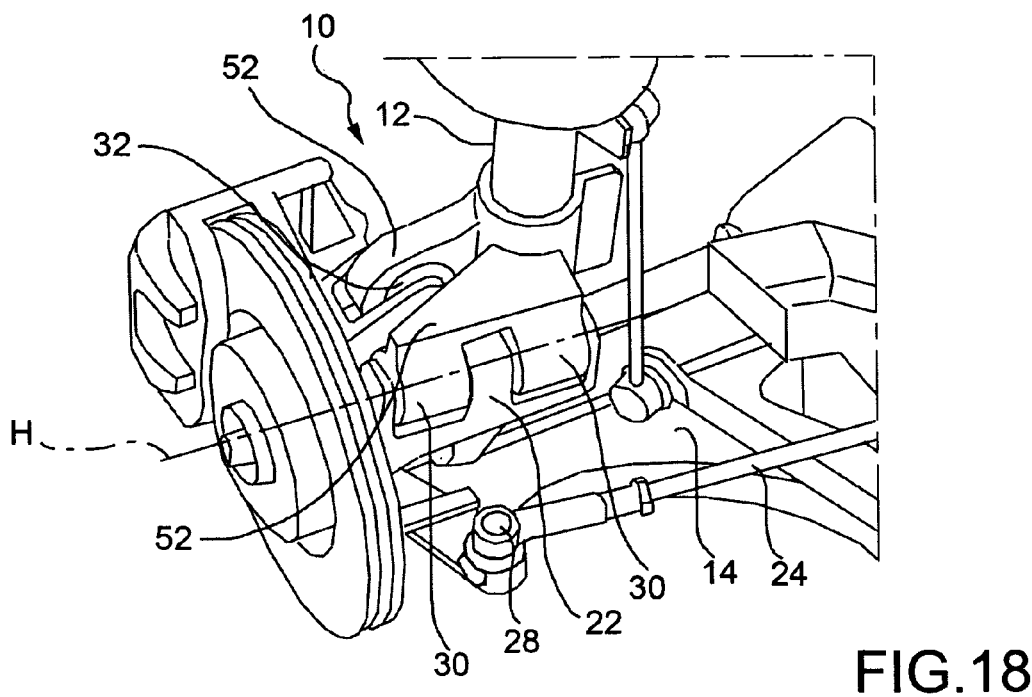
FIG. 18 is a perspective view of a vehicle independent suspension architecture according to another embodiment of the invention.
Figure 19:
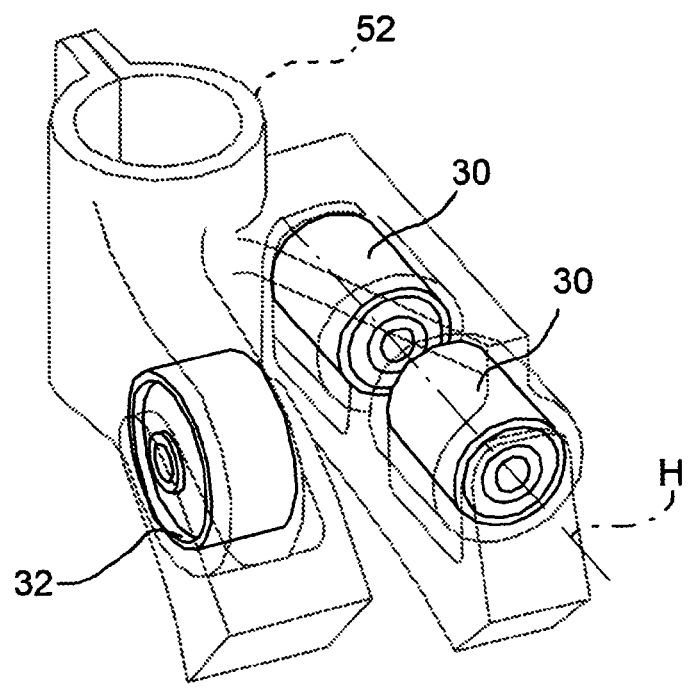
FIG. 19 is a phantom perspective view which shows the arrangement of the bushes for connection between damper and knuckle in the suspension of FIG. 18.

A further embodiment of a vehicle independent suspension according to the invention is illustrated in FIG. 18 and 19, where parts and elements identical or operatively equivalent to those of FIG. 3 and 4 have been given the same reference numerals. According to this embodiment, the axis of articulation "H" is defined by a pair of aligned rigid bushes 30, while the torsional stiffness of the articulated connection between damper 12 and knuckle 22 is provided by a soft bush 32. The two rigid bushes 30 have a high radial stiffness, for example in the order of $10^4$N/mm (purely by way of example, $3 \times 10^4$N/mm), while the soft bush 32 has a low radial stiffness, for example in the order of $10^2$N/mm (purely by way of example, 3.5 $\times 10^2$N/mm), i.e. radial stiffness about two orders lower than that of the rigid bushes 30. The soft bush 32 is spaced apart from the axis of the two rigid bushes 30 (axis of articulation "H") and is oriented in such a manner that its own axis intersects the axis "H" Accordingly, the radial stiffness of the soft bush 32 acts tangentially with respect to the axis "H," that is to say, it acts as a torsional stiffness with respect to the articulated connnection between damper and knuckle 22 about the axis "H". In the embodiment provided, the pins of articulation of the bushes 30 and 32 are carried by respective fork-like support structures of the knuckle 22, while the outer bodies of the bushes 30 and 32 are received in respective supports formed by the bracket member 52 mounted at the bottom end of the damper 12.

FIGS. 20 to 27, where parts and elements identical or operatively equivalent to those of the preceding figures have been given the same reference numerals, illustrate further embodiments of the invention, which share the idea of providing a flexible plate member, in particular a blade-like member, which is connected on the one hand to the damper and on the other to the knuckle to provide the articulated connection between these two components of the suspension. The blade-like member may be made either of a metal or of a non-metal (for example a carbon fibre composite). By virtue of its own bending compliance, the blade-like member allows in fact relative rotations about its own bending axis between the two components connected thereto. On the other hand, since the plate-like member has a certain, though limited, bending stiffness, about its own bendmg axis, the plate member performs at the same time, least in part, also the function of controlling the torsional stiffness of the articulated connection between damper and knuckle about the axis of articulation. The blade-like member is connected to the damper and to the knuckle so as to be subject to tension under static load. In this embodiment, a buffer device, which will be disclosed hereinafter in connection with some possible embodiments, is associated to the blade-like member.

Figure 20:
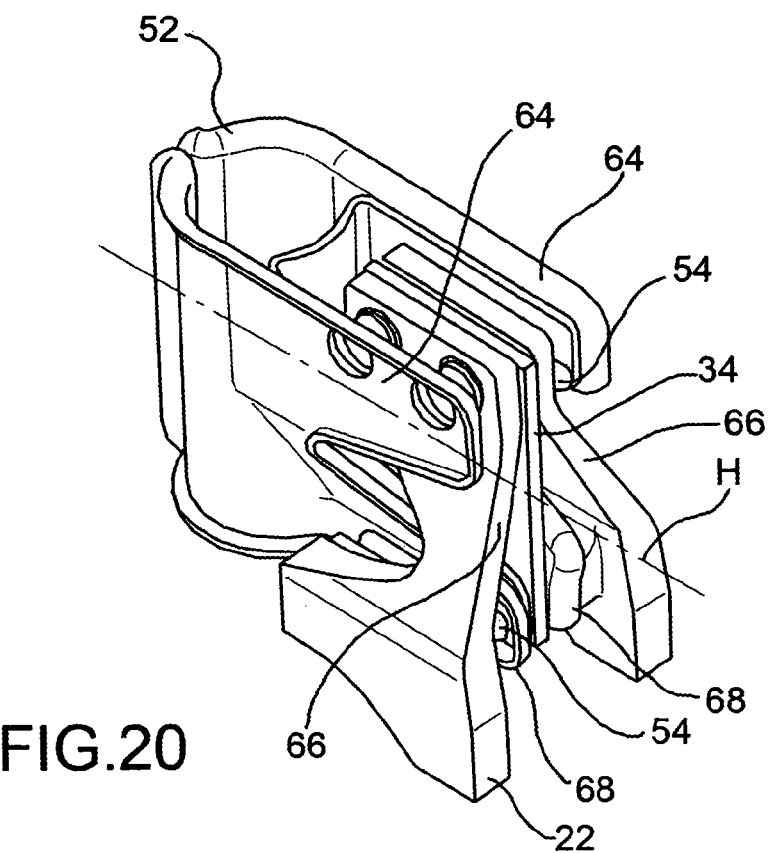
FIG. 20 is a perspective view which shows in detail the articulated connection mechanism between damper and knuckle of a vehicle independent suspension architecture according to another embodiment of the invention.
Figure 21:
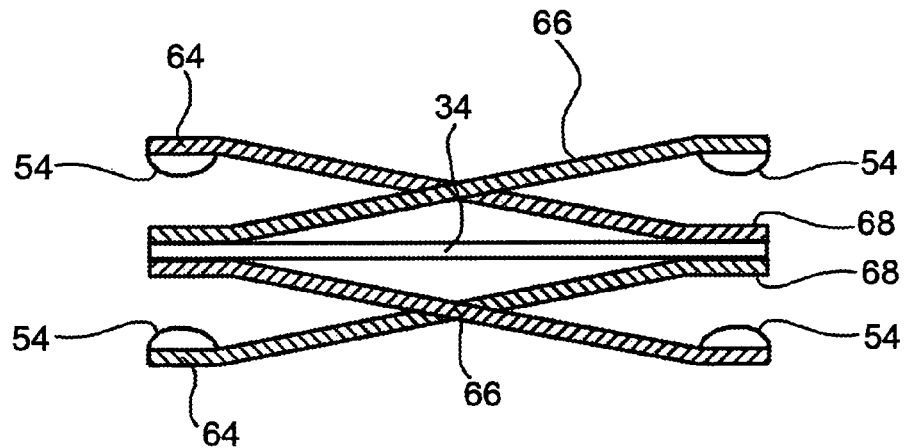
FIG. 21 is a section view which schematically shows the articulated connection mechanism between damper and knuckle of FIG. 20.
Figure 22:
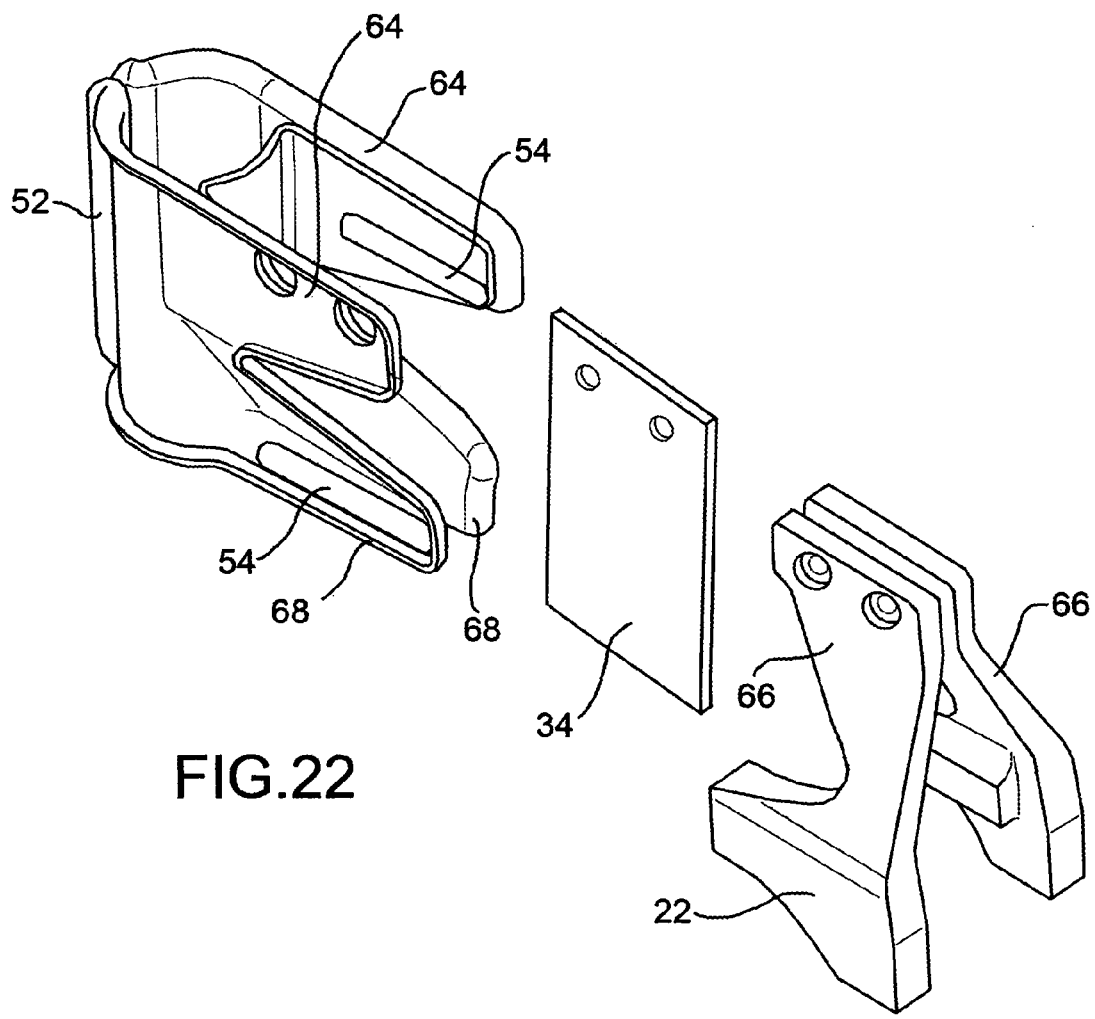
FIG. 22 is an exploded view of the articulated connection mechanism between damper and knuckle of FIG. 20.

With reference to FIGS. 20 to 22, a blade-like member 34 is arranged between a bracket member 52 mounted at the bottom end of the damper (not shown) and the knuckle 22 and lies substantially in a transverse vertical plane so as to define, by virtue of its own bending compliance, an axis of articulation "H" between and knuckle 22 which is oriented substantially transversely. Depending on the orientation ofthe blade-like member 34 in the transverse vertical plane, the axis of articulation "H" may be directed horizontally or inclined by a certain angle to the horizontal to obtain a greater control of the toe change under braking and traction longitudinal forces, and hence improved vehicle stability during braking and acceleration maneuvers. The blade-like member 34 is rigidly connected at its upper end, for example by screw connection, to the upper ends of a pair of vertical arms 64 of the knuckle 22 converging upwards. The bracket member 52 forms a pair of horizontal upper arms 66, which extend parallel to each other at the same level as the upper ends of the blade-like member 34 and of the vertical arms 64 of the knuckle 22 outwardly with respect to these latter, and a pair of horizontal lower arms 68 which extend at the same level as the lower ends of the blade-like member 34 and of the vertical arms 64 of the knuckle 22 and converge towards each other so as to be interposed between the lower ends of the arms 64 and to clamp the lower end of the blade-like member 34, to which they are rigidly fixed for example by welding. By virtue of such an arrangement, the weight of the vehicle acting through the damper on the blade-like member 34 produces tension stresses on that member. The arms 66 of the knuckle 22 and the arms 64, 68 of the bracket member 22 have a bending stiffness which is significantly higher than that of the blade-like member 34, whereby it is the blade-like member 34, not the arms 64, 66 and 68, that allows and controls the relative rotational movement between damper and knuckle. As can be seen in particular in FIG. 21, rubber buffers 54 are interposed between the arms 66 of the if knuckle 22 and the arms 64, 68 of the bracket member 52 and have the function of avoiding direct contact between the facing ends of the arms in case of large angular displacements between damper and knuckle.

According to the embodiment illustrated, in FIGS. 23 and 24, the blade-like member 34 is rigidly connected at its lower end to a lower horizontal arm 68 extending from the bracket member 52 mounted at the bottom end of the damper (not shown) and at its upper end to a vertical arm 66 of the knuckle (not shown). As far as the orientation of the blade-like member 34 is concerned, what has been stated above with reference to the embodiment of FIGS. 20 to 22 applies. Also in this embodiment, in fact, the blade-like member 34 lies substantially in a transverse vertical plane so as to define, by virtue of its own bending compliance, an axis of articulation between damper and knuckle which is directed substantially transversely. Depending on the orientation of the blade-like member 34 in the transverse venical plane, the axis of articulation "H" may be directed horizontally or inclined by a certain angle to the horizontal to obtain a greater control of the toe change under braking and traction longitudinal forces, and hence an improved vehicle stability during braking and acceleration maneuvers. The buffer device is in this embodiment in a robber bush 70, having a non-linear stiffness characteristic, whose axis is spaced apart from the blade-like member 34 and is oriented parallel to the axis of articulation "H ". In the illustrated embodiment, the outer body of the bush 70 is mounted in a special seat in the vertical arm 66 of the knuckle, while the inner body is fitted onto an upper horizontal arm 72 projecting from the bracket member 52.

Figure 25:
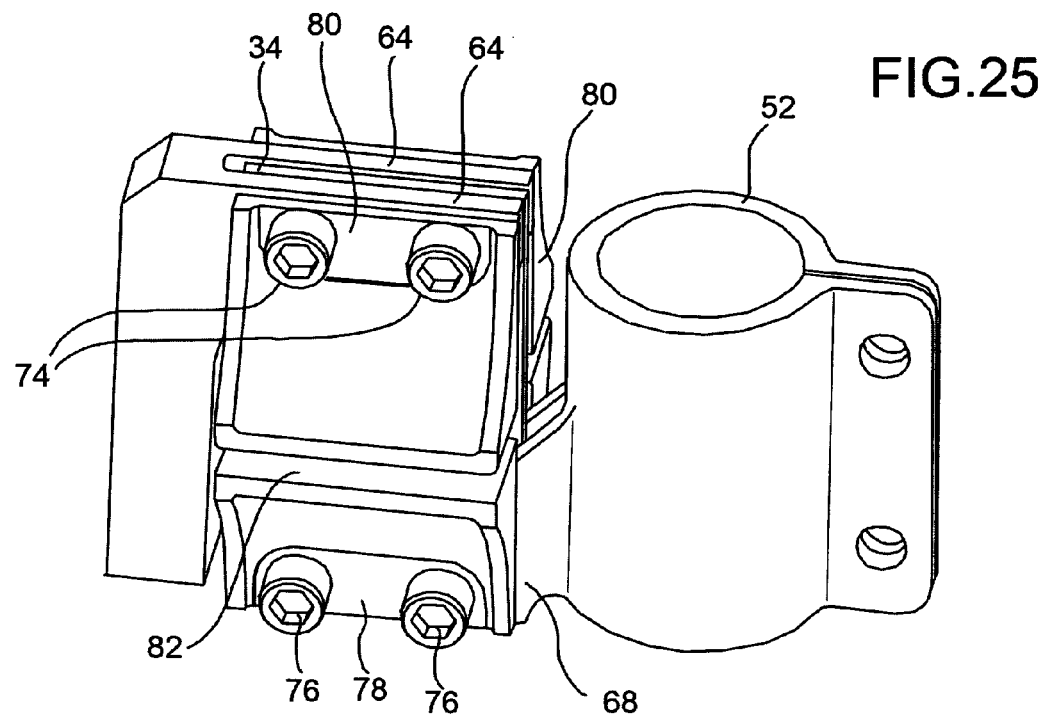
FIG. 25 is a perspective view which shows in detail the articuiated connection mechanism between damper and knuckle of a vehicle independent suspension architecture according to another embodiment of the invention.
Figure 26:
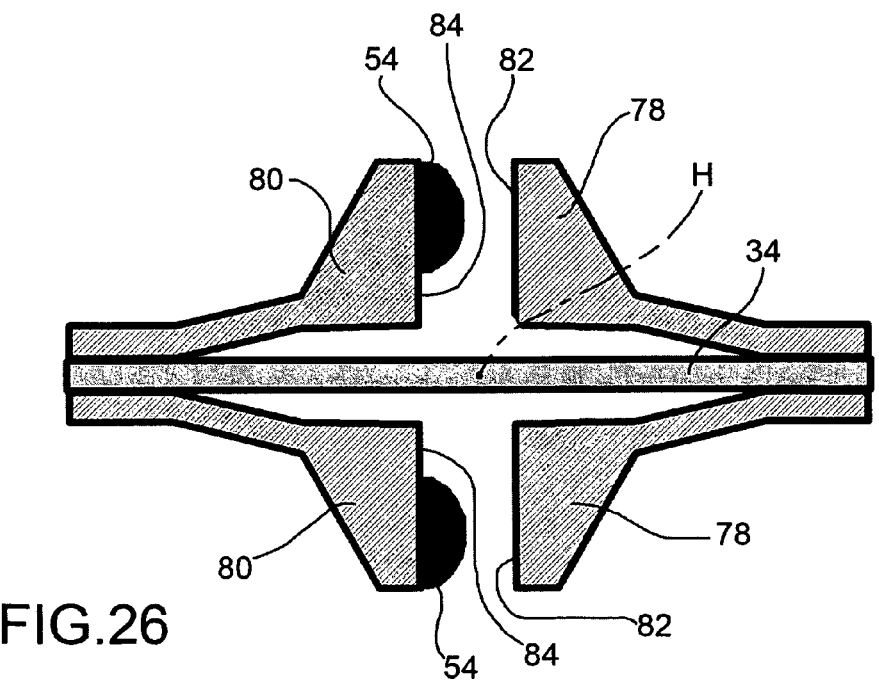
FIG. 26 is a section view which schematically shows the articulated connection mechanism between damper and knuckle of FIGS. 25.
Figure 27:
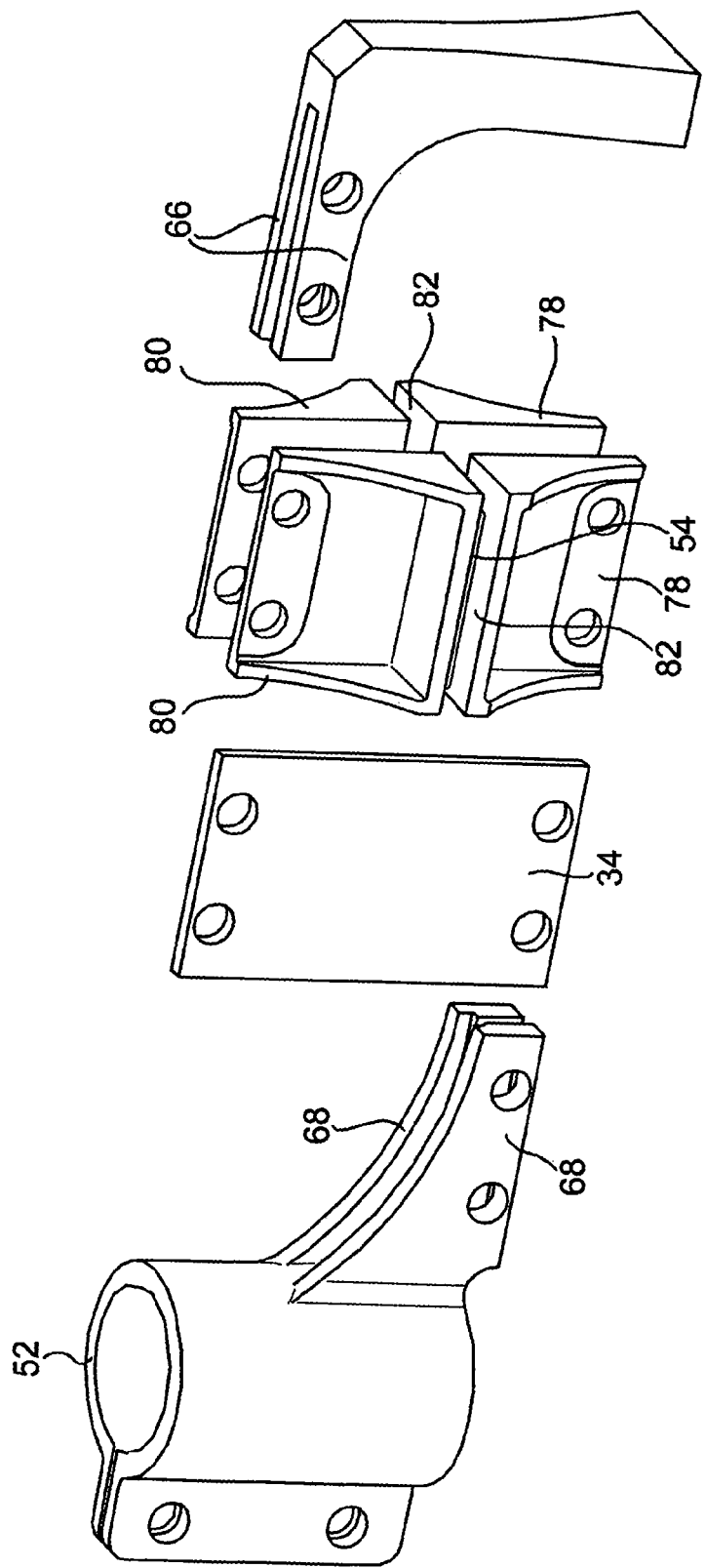
FIG. 27 is an exploded view of the articulated connection mechanism between damper and knuckle of FIG. 25.

Finally, according to the embodiment illustrated in FIGS. 25 to 27, the blade-like member 34 is rigidly connected at its lower end, for example by screws 74, to a pair of lower horizontal arms 68 which extend from the bracket member 52 mounted at the bottom end of the damper (not shown) and at its upper end, for example by screws 76, to a pair of upper horizontal arms 66 of the knuckle (not shown). As far as the orientation of the blade-like member 34 is concerned, what has been stated above with reference to the embodiment of FIGS. 20 to 22 applies. As far as the position of the axis of articulation "H" is concerned, it approximately coincides (at least for small displacements) with that of the axis blade-like member 34, as indicated in FIG. 26. The buffer device is in this embodiment a pair of lower abutment members 78 which are rigidly connected to the lower end of the blade-like member 34 and extend upwards on opposite sides of the blade-like member, and in a pair of upper abutment members 80 which are rigidly connected the upper end of the blade-like member 34 and extend downwards on opposite sides of the blade-like member. The lower abutment members 78 and fhe upper abutment members 80 have respective horizontal abutment surfaces 82 and 84, which are facing and spaced apart two by two. Respective rubber buffet 54 having a similar function to that of the rubber buffers described with reference to the embodiment of FIG. 20 to 22 are fixed to two of the abutment surfaces, in the illustrated embodiment to the surfaces 84 of the upper abutment members 80.

Naturally, the principle of the invention remaining unchanged, the embodiments and manufacturing details may be widely varied with respect to those described and illustrated purely by way of non-limiting example.

For example, although the invention has been described and illustrated with reference to a front suspension, it is equally well applicable to a rear suspension. In other words, the invention is applicable both to suspensions for steering wheels and to suspensions for non-steering wheels. In particular, in case of a rear suspension the triangular lower arm and the steering rod may be replaced by three lower rods (two transverse rods and one longitudinal rods), each articulated at the one end to the knuckle and at the opposite end to the vehicle body, in order to control the remaining three degrees of freedom of the wheel-carrier. However, the invention may be applied equally well to any other suspension architecture including a structural damper and an arm/rod system interposed between the wheel-carrying knuckle and the vehicle body to control three degrees of freedom of the wheel-carrying knuckle.

Moreover, the invention is applicable not only to suspensions for motorcar but generally to suspensions for motorvehicles of any kind, from light industrial vehicles to heavy industrial vehicles, from three- or four-cycles to buses.

The invention has been described above in an illustrative manner. It is to be understood that the terminology that has been used above is intended to be in the nature of words of description rather than of limitation. Many modifications and variations of the invention are possible in light of the above teachings. Therefore, within the scope of the appended claims, the invention may be practiced other than as specifically described above.

What is claimed is:

1. An independent suspension (10) of a vehicle, the suspension comprising:
   a knuckle (22) intended to carry a wheel (W);
   a damper (12) connected at a bottom end thereof to the knuckle (22);
   a plurality of arms (14, 24) connected to a body (B) of the vehicle and the knuckle (22);
   a hinge device (34) interposed between the damper (12) and the knuckle (22) to allow the damper (12) and the knuckle (22) to rotate relative to each other about an axis of articulation (H) that is oriented to form an angle between 0° and 45°, limits included with a horizontal; and
   a torsional stiffness control device (70) interposed between the damper (12) and the knuckle (22) to control torsional stiffness of an articulated connection between the damper (12) and the knuckle (22) about the axis of articulation (H);
   wherein the hinge device includes a flexible plate member (34), the axis of articulation (H) being defined by a bending axis of the plate member (34);
   wherein the flexible plate member (34) lies substantially in a transverse vertical plane and is rigidly connected at an upper end of the plate member (34) to the knuckle (22) and at a lower end of the flexible plate member (34) to the damper (12);and
   wherein the torsional stiffness control device includes a rubber bush (70) an axis of which is spaced apart from the flexible plate member (34) and is oriented parallel to the axis of articulation (H), and the bush (70) has an outer body that is rigidly connected to the knuckle (22) and an inner body that is rigidly connected to the damper (12).

2. An independent suspension (10) of a vehicle, the suspension comprising:
   a knuckle (22) intended to carry a wheel (W);
   a damper (12) connected at a bottom end thereof to the knuckle (22);
   a plurality of arms (14, 24) connected to a body (B) of the vehicle and the knuckle (22);
   a hinge device (34) interposed between the damper (12) and the knuckle (22) to allow the damper (12) and the knuckle (22) to rotate relative to each other about an axis of articulation (H) that is oriented to form an angle between 0° and 45°, limits included with a horizontal; and
   a torsional stiffness control device (54, 78, 80) interposed between the damper (12) and the knuckle (22) to control torsional stiffness of an articulated connection between the damper (12) and the knuckle (22) about the axis of articulation (H);

wherein the hinge device includes a flexible plate member (34), the axis of articulation (H) being defined by a bending axis of the flexible plate member (30);

wherein the flexible plate member (34) lies substantially in a transverse vertical plane and is rigidly connected at an upper end of the flexible plate member (34) to the knuckle (22) and at a lower end of the flexible plate member (34) to the damper (12); and wherein the torsional stiffness control device (54, 78, 80) includes a pair of lower abutment members (78) that are rigidly connected to the lower end of the flexible plate member (34) and extend upwards on opposite sides of the flexible plate member (34), a pair of upper abutment members (80) that are rigidly connected to the upper end of the flexible plate member (34) and extend downwards on opposite sides of the flexible plate member (34), and a pair of rubber buffers (54) interposed between pairs of horizontal abutment surfaces (82, 84) of the lower and upper abutment members (78, 80), which are facing and spaced apart two by two.

3. The suspension according to claim 2, wherein the suspension comprises further a lower control arm (14) having a pair of transversely inner attachment points (16, 18) for articulated connection to the vehicle body (B), a transversely outer attachment point (20) for articulated connection to the knuckle (22), a steering rod (24) having a transversely inner attachment point (26) for connection to a vehicle steering control mechanism, and a transversely outer attachment point (28) for articulated connection to the knuckle (22).

4. The suspension according to claim 2, wherein the suspension comprises further a pair of transverse rods and a longitudinal rod, each of which is articulated at one end thereof to the knuckle (22) and intended to be articulated at an opposite end thereof to the vehicle body (B).

* * * * *